US006976063B1

(12) United States Patent
Dharmarajan et al.

(10) Patent No.: US 6,976,063 B1
(45) Date of Patent: Dec. 13, 2005

(54) METHOD AND SYSTEM FOR DYNAMICALLY CONFIGURING A SERVER COMPUTER

(75) Inventors: Baskaran Dharmarajan, Mountain View, CA (US); Marcus J. Jager, Boulder Creek, CA (US); Jay C. Jacobs, Danville, CA (US)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 09/704,625

(22) Filed: Nov. 2, 2000

(51) Int. Cl.[7] .......................................... G06F 15/177
(52) U.S. Cl. ................. 709/220; 709/217; 709/218; 709/219; 709/221; 709/223; 709/224; 370/254
(58) Field of Search .................. 709/220–224, 709/217–219; 370/254

(56) References Cited

U.S. PATENT DOCUMENTS

| 5,852,722 | A | * | 12/1998 | Hamilton | 709/221 |
| 6,012,088 | A | * | 1/2000 | Li et al. | 709/219 |
| 6,029,196 | A | * | 2/2000 | Lenz | 709/221 |
| 6,041,347 | A | * | 3/2000 | Harsham et al. | 709/220 |
| 6,134,600 | A | * | 10/2000 | Liu | 719/316 |
| 6,300,948 | B1 | * | 10/2001 | Geller et al. | 715/866 |
| 6,314,516 | B1 | * | 11/2001 | Cagle et al. | 713/1 |
| 6,405,219 | B2 | * | 6/2002 | Saether et al. | 707/201 |
| 6,421,719 | B1 | * | 7/2002 | Lewis et al. | 709/224 |
| 6,515,756 | B1 | * | 2/2003 | Mastie et al. | 358/1.15 |
| 6,567,849 | B2 | * | 5/2003 | Ludovici et al. | 709/223 |
| 6,871,221 | B1 | * | 3/2005 | Styles | 709/221 |

OTHER PUBLICATIONS

Karamanolis et al., "A Replication Protocol to Support Dynamically Configurable Groups of Servers", 161-168.*

* cited by examiner

Primary Examiner—David Wiley
Assistant Examiner—Phuoc H. Nguyen
(74) Attorney, Agent, or Firm—Christensen O'Connor Johnson Kindness PLLC

(57) ABSTRACT

A method and system for dynamically configuring a server computer is provided. A global configuration file is utilized to configure a server computer on a per request basis. When a request is received at a server computer embodying aspects of the present invention, the server computer dynamically configures itself utilizing the contents of a global configuration file. The global configuration file contains configuration settings that may or may not be utilized by the server computer in configuring itself. To determine if particular configuration settings should be utilized by the server computer in configuring itself, the server computer parses rules also contained in the global configuration file. If a rule is evaluated as true, configuration settings associated with the rule are used by the server computer when configuring itself. The server computer can then respond to the request utilizing its dynamic configuration.

13 Claims, 6 Drawing Sheets

METHOD AND SYSTEM FOR DYNAMICALLY CONFIGURING A SERVER COMPUTER

FIELD OF THE INVENTION

This invention generally relates to the field of client/server computing devices and, more specifically, relates to a method and system for dynamically configuring a server computer.

BACKGROUND OF THE INVENTION

Large-scale World Wide Web ("Web" or "WWW") sites typically utilize large clusters, or "farms," of Web servers to respond to incoming Web page requests. Because the volume of requests received at popular Web sites can be enormous, literally thousands of separate Web server computers may be utilized in such a Web server farm. When a request is received for a Web page available through the Web server farm, the request is assigned to one of the available Web server computers through the use of a load balancing device. By receiving Web page requests at a central location and then routing the request to an available Web server computer in this manner, a large volume of requests may be easily handled. However, while server farms configured in this manner can respond to a large number of Web page requests efficiently, the configuration and maintenance of thousands of Web server computers can be extremely time consuming and expensive.

One of the difficulties in configuring a large group of Web server computers arises from the fact that each server computer utilizes unique configuration files. For instance, the location of a particular server computer in the network may cause its configuration files to be different from the configuration files on other server computers located at other locations in the network. If a server computer is moved to a different location within the network, it may not function properly in its new location because the configuration files correspond to the previous location of the computer. Such a problem can be extremely difficult to diagnose when thousands of server computers are utilized.

Another difficulty that arises when a large-scale farm of Web servers is utilized occurs when it is necessary to "brand" the Web site for different business partners. Because the domain name to which a particular Web server responds is fixed in the configuration file, the Web server can only respond to requests from that specific domain. For instance, a Web server for providing Web-based e-mail services that is configured to receive requests for the "www.hotmail.com" domain can only respond to requests for that particular domain. If a business partner wanted to provide a branded Web-based e-mail service using the same functionality at another domain, an entirely separate Web server computer would have to be utilized to provide the branded Web site. Therefore, much of the capability of the Web server would have to be recreated for the branded Web site.

Accordingly, in light of the above problems, there is a need for a method and system for dynamically configuring a server computer that can utilize a single configuration file to dynamically configure multiple server computers. There is a further need for a method and system for dynamically configuring a server computer that allows a server computer to correctly configure itself regardless of its location within a network. There is a further need for method and system for dynamically configuring a server computer that allows a server computer to respond to requests received from multiple domains.

SUMMARY OF THE INVENTION

The present invention solves the above problems by providing a method and system for dynamically configuring a server computer that can utilize a single configuration file to dynamically configure multiple server computers. Moreover, the present invention provides a method and system for dynamically configuring a server computer that permits a server computer to correctly configure itself regardless of its location within a network. Additionally, the present invention provides a method and system for dynamically configuring a server computer that allows a server computer to respond to requests received from multiple domains.

Generally described, the present invention provides a method and system for dynamically configuring a server computer that utilizes a global configuration file to configure a server computer on a per request basis. When a request is received at a server computer embodying aspects of the present invention, the server computer dynamically configures itself utilizing the contents of a global configuration file. The global configuration file contains configuration settings that may or may not be utilized by the server computer when configuring itself. To determine if particular configuration settings should be utilized by the server computer when configuring itself, the server computer parses rules also contained in the global configuration file. If a rule is evaluated as true, configuration settings associated with the rule are used by the server computer when configuring itself. The server computer can then respond to the request utilizing a dynamic configuration.

More specifically described, the present invention provides a method and system for dynamically configuring a server computer, like a Web server computer. When a request is received at a server computer embodying aspects of the present invention, one or more configuration settings are identified and stored in a settings file. These configuration settings may be identified based upon information received as a part of the request, such as a Uniform Resource Identifier ("URI"). Once a predetermined number of configuration settings have been identified, the server computer parses a global configuration file to determine additional configuration settings that may be utilized to configure the server computer.

The global configuration comprises one or more blocks. Each block is identified by a unique name and may include an associated Boolean statement, or rule. Each rule contains one or more elements that, when evaluated together as true, cause configuration settings, also associated with the block, to be utilized by the server computer in configuring itself. Blocks may also include rules that are always evaluated as true. In this manner, the configuration settings associated with such a block are always included in the settings file. Additionally, the global configuration file may identify one or more required configuration settings that must be present in order for the server computer to correctly configure itself.

To parse the global configuration file, the server computer evaluates the rules identified in the global configuration file with the current contents of the settings file. If a rule is evaluated as true, the configuration settings associated with the rule are added to the settings file. Each rule in the configuration file is then evaluated with the updated contents of the settings file. When all of the blocks in the configuration file are evaluated as untrue using the current contents of the settings file, the server computer determines if the global configuration file identifies any required configuration settings. If any required configuration settings are not present in the settings file, the server computer generates an error message. If all required settings are present in the settings file, the server computer utilizes the configuration settings contained in the settings file to configure itself. The server computer then responds to the request.

The present invention also provides a computer-controlled apparatus, a computer-readable medium, and a system for dynamically configuring a server computer. Additionally, the present invention provides a method and system for verifying the contents of a global configuration file.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

The present invention is directed to a method and system for dynamically configuring a server computer. The present invention may be embodied in a Web server application program, such as the Internet Information Server program owned and licensed by the Microsoft® Corporation of Redmond, Wash.

Referring now to the figures, in which like numerals represent like elements, an actual embodiment of the present invention will be described. Although aspects of the invention will be described in the general context of an application program that executes on an operating system in conjunction with a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. Although the invention is also described as being practiced in distributed computing environment, where tasks are performed by remote processing devices that are linked through a communications network, other possible implementations should be apparent to those skilled in the art.

Figure 1:
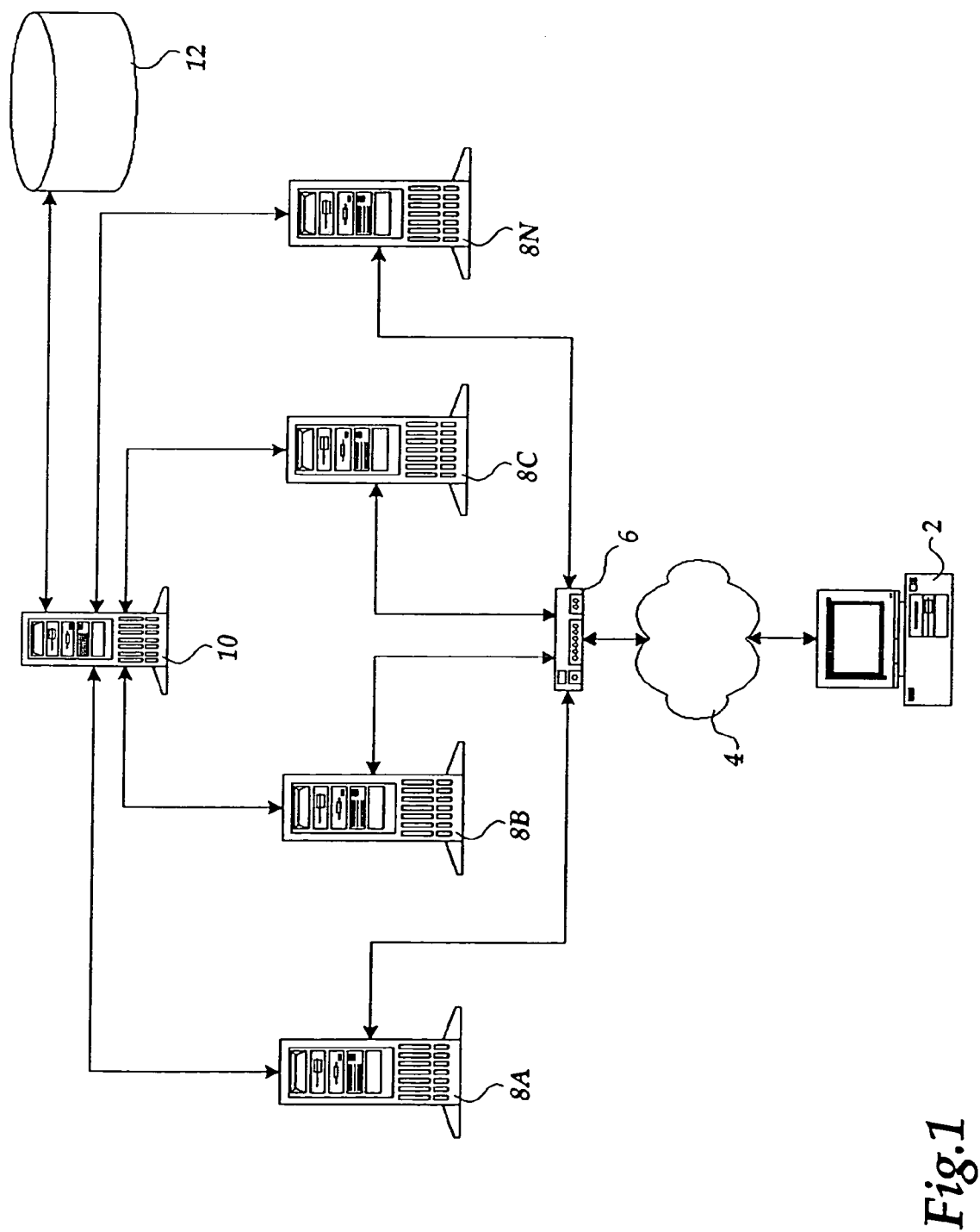
FIG. 1 is a block diagram illustrating an illustrative operating environment for an actual embodiment of the present invention.

Referring now to FIG. 1, an illustrative operating environment for an embodiment of the present invention will be described. Aspects of the present invention are implemented in a server computer; such as Web server computers 8A–8N, accessible via a distributed computing network, such as the Internet 4. As is well known to those skilled in the art, the Internet 4 comprises a collection of networks and routers that use the Transmission Control Protocol/Internet Protocol ("TCP/IP") to communicate with one another. The Internet typically includes a plurality of local area networks ("LANs") and wide area networks ("WANs") that are interconnected by routers. Routers are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers, such as client computer 2, and other related electronic devices can be remotely connected to either the LANs or the WANs via a permanent network connection or via a modem and temporary telephone link. It will be appreciated that the Internet 4 comprises a vast number of such interconnected networks, computers, and routers.

A client computer 2 capable of executing a Web browser application program (not shown), such as Microsoft® Internet Explorer, may be utilized to transmit a request for a Web page to one of the Web server computers 8A–8N. As is well known to those skilled in the art, the Web is a vast collection of interconnected or "hypertext" documents written in Hypertext Markup Language ("HTML"), or other markup languages, that are available from "Web sites" accessible through the Internet. A Web site is provided by a Web server computer, like Web server computers 8A–8N, connected to the Internet 4, that has mass storage facilities for storing such hypertext documents, and that executes administrative software for handling requests for the hypertext documents.

Large-scale Web sites are typically implemented utilizing a two-tier computer systems architecture as shown in FIG. 1. The first tier typically comprises one or more "front-end" Web server computers, like Web server computers 8A–8N, that receive and processes live requests for Web pages from a client computer 2 connected to the Internet 4. As is well known to those skilled in the art, the first tier Web servers are frequently connected to the Internet 4 through a load balancing device 6, such as the Local Director from Cisco Systems. The load balancing device 6 intercepts requests intended for a one of the Web server computers 8A–8N and forwards each request to a Web server computer that has the resources available to respond to the request.

In addition to the Web server computers 8A–8C, a large-scale Web site may also include a "back-end" server computer 10 that stores user information, Web pages, graphics files, and other resources that may be served to client computer 2 by one of the Web server computers 8A–8N. The back-end server computer 10 may store this information in a database 12 that is located either local or remotely.

Figure 2:
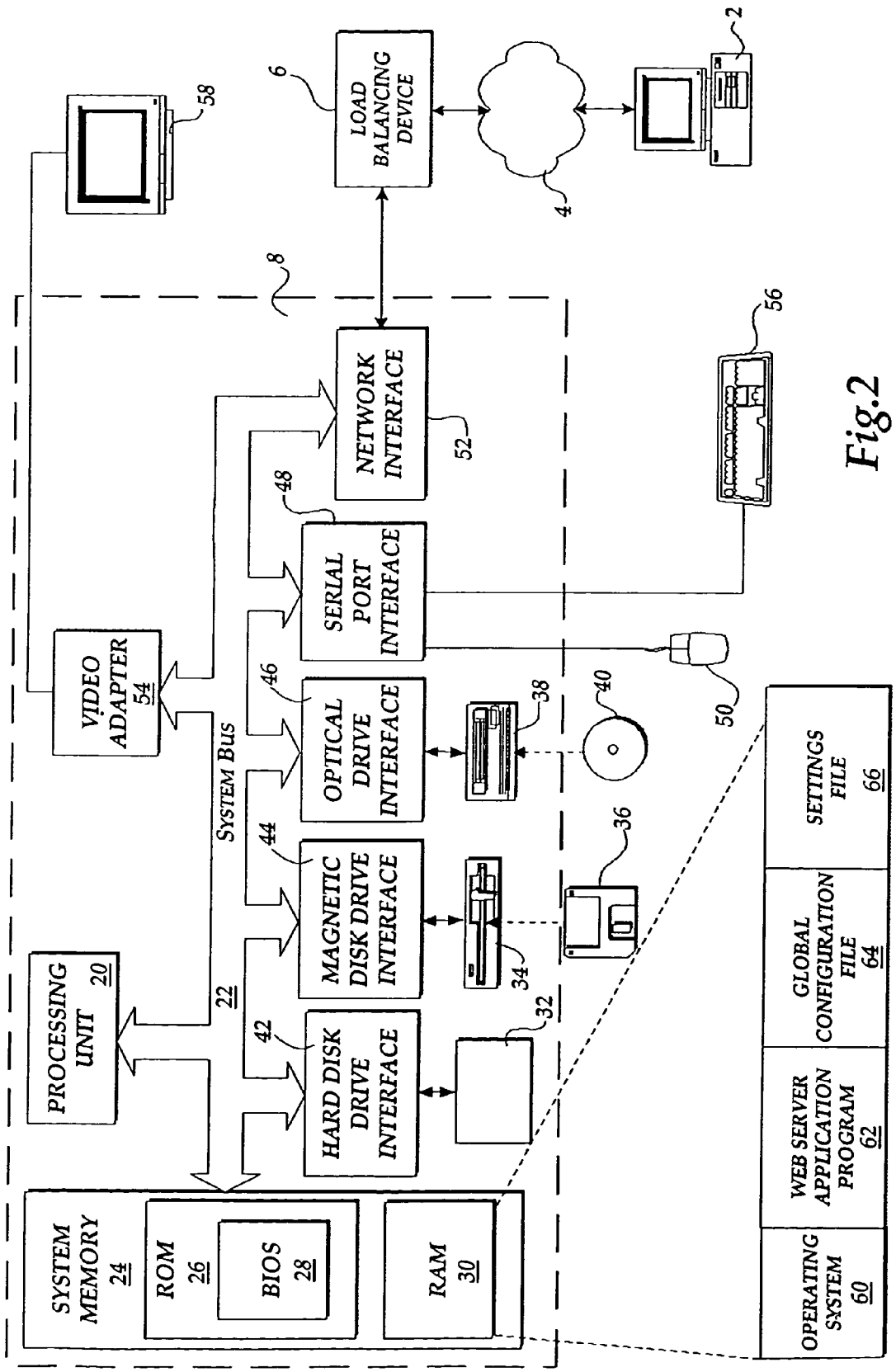
FIG. 2 is a block diagram illustrating a server computer utilized in an actual embodiment of the present invention.

Referring now to FIG. 2, an illustrative Web server computer 8 will be described. As mentioned briefly above, a communications session is initiated over the Internet 4 or other distributed computing network between the Web server computer 6 and a client computer 2. Typically, the communications session is initiated in response to a request for a resource, like a WWW page (not shown), located at the Web server computer 8. According to an embodiment of the present invention, the Web server computer 8 configures itself dynamically when the communications session is initiated with the client computer 2. An illustrative routine is described below with reference to FIG. 5 for receiving such requests and configuring the Web server computer 8.

The Web server computer 8 comprises a general purpose server computer for receiving and responding to Hypertext Transfer Protocol ("HTTP") requests as known to those skilled in the art. The Web server computer 8 comprises a conventional server computer, including a processing unit 20, a system memory 24, and a system bus 22 that couples the system memory 24 to the processing unit 20. The system memory 24 includes a read only memory ("ROM") 26 and a random access memory ("RAM") 30. A basic input/output system 28 ("BIOS"), containing the basic routines that help to transfer information between elements within the Web server computer 8, such as during start-up, is stored in ROM 26. The Web server computer 8 further includes a hard disk drive 32, a magnetic disk drive 34, e.g., to read from or write to a removable disk 36, and an optical disk drive 38, e.g., for reading a CD-ROM disk 40 or to read from or write to other optical media such as a Digital Versatile Disk ("DVD"). The hard disk drive 32, magnetic disk drive 34, and optical disk drive 38 are connected to the system bus 22 by a hard disk drive interface 42, a magnetic disk drive interface 44, and an optical drive interface 46, respectively. The drives and their associated computer-readable media provide nonvolatile storage for the Web server computer 8.

A number of program modules may be stored in the drives and RAM 30, including an operating system 60 suitable for controlling the operation of a server computer, such as Windows NT® or Windows® 2000 from Microsoft®. Additionally, a Web server application program 62 may be stored in RAM 30, like Internet Information Server, also from Microsoft®. As known to those skilled in the art, the Web server application program 62 is operative to receive HTTP requests through the network interface 52 and to respond to those requests. Typically, an HTTP request will take the form of a request for a page encoded in HTML, a graphics file, or another application program stored at, or accessible to, the Web server computer 8. As will be described in more detail below, the Web server computer 8 may dynamically configure itself when a request is received utilizing a global configuration file 64 and a settings file 66. The format and contents of the global configuration file 64 and the settings file 66 are described below with respect to FIGS. 3A and 3B, respectively. The operation of the Web server computer 8 is described in more detail below with reference to FIGS. 5–7.

A user may control the operation of the Web server computer 8 through input devices such as a keyboard 56 or a mouse 50. These and other input devices are often connected to the processing unit 20 through a serial port interface 48 that is coupled to the system bus 22, but may be connected by other interfaces, such as a universal serial bus ("USB"). A monitor 58 or other type of display device is also connected to the system bus 22 via an interface, such as a video adapter 54. In addition to the monitor, a Web server computer 8 may include other peripheral output devices, such as a printer (not shown).

As described above with respect to FIG. 1, the Web server computer 8 operates in a networked environment. According to an embodiment of the invention, the Web server computer 8 communicates with the client computer 2 over the Internet 4. The Web server computer 8 connects to the Internet 4 through a network interface 52. Alternatively, the Web server computer 8 may include a modem (not shown) and use an Internet Service Provider ("ISP") to establish a connection to the Internet 4. Additionally, a load balancing device 6 may be provided to direct network traffic to the Web server computer 8. It will be appreciated that the network connections shown are illustrative and other means of establishing a communications link between the Web server computer 8 and the Internet 4 may be used.

Figure 3:
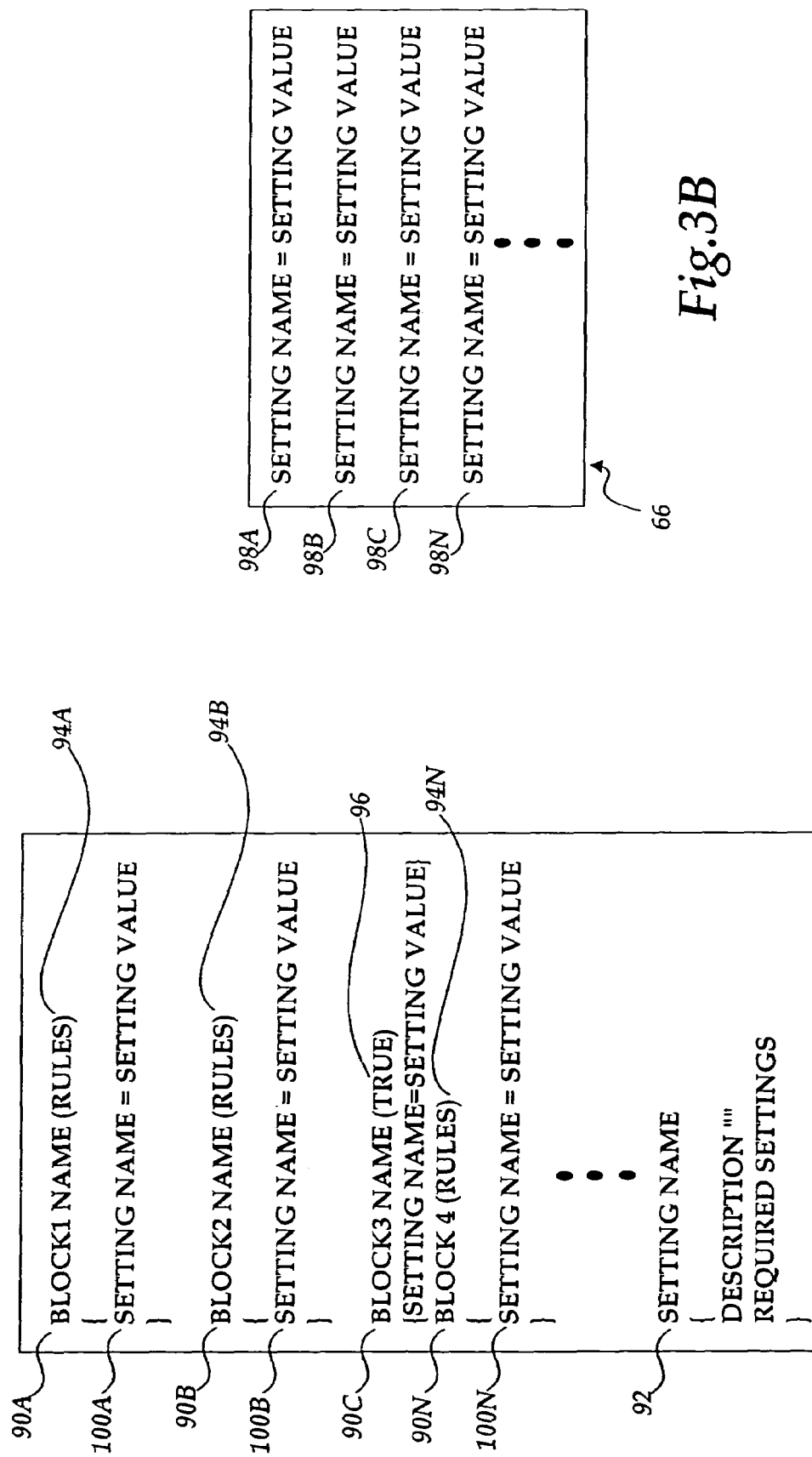
FIG. 3A is a block diagram illustrating the data structure format of a global configuration file utilized by a server computer in an actual embodiment of the present invention.
FIG. 3B is a block diagram illustrating the data structure format of a settings file utilized by a server computer in an actual embodiment of the present invention.

Referring now to FIG. 3A, a data structure for a global configuration file 64 utilized in an embodiment of the present invention will be described. The global configuration file 64 comprises a plurality of blocks 90A–90N. Each block is identified by a unique name and may include an associated rule 94A–94N. A rule 94A–94N comprises a Boolean expression that may be evaluated as true or false depending upon the values of the configuration settings or other variables contained in the rule. Each block 90A–90N may also have one or more associated configuration settings 100A–100N. Configuration settings 100A–100N comprise a setting name and a corresponding value that corresponds to an actual configuration parameter within the Web server computer. As will be described in greater detail below, the rule associated with each block is evaluated by the Web server computer using the contents of a settings file. Those skilled in the art should appreciate that many types of rules and tests for determining whether rules are satisfied may be utilized.

A block may also include a rule 96 that is always evaluated as true, such as block 90C. By using such a rule 96, the configuration settings associated with the block are always included in the settings file. Additionally, a block may include a rule that is always false. Such a rule may be useful for blocks that are only intended to be included from other blocks. Moreover, the global configuration file may contain a required settings parameter 92. The required settings parameter 92 identifies one or more configuration settings that must be included in the settings file in order for the Web server computer to configure itself correctly. As will be described below with respect to FIG. 6, an error message may be generated at the Web server computer if the configuration settings identified by the required settings parameter 92 are not present in the settings file.

The list of settings associated with a first block may also include the name of a second block. When the block is evaluated as true, the configuration settings associated with the second block are then included in the settings file along with any configuration settings associated with the first block. In this manner, many different blocks may trigger a group of configuration settings without explicitly stating them with each block.

Referring now to FIG. 3B, a data structure for an illustrative settings file 66 utilized in an embodiment of the present invention will be described. The settings file 66 comprises one or more configuration settings 98A–98N. As described above, configuration settings 98A–98N comprise a setting name and a corresponding value that corresponds to an actual configuration parameter within the Web server computer. As will be described in greater detail below, the configuration settings 98A–98N are added to the configuration file dynamically as the global configuration file is parsed. When the Web server computer has completed its parse of the global configuration file, the configuration settings 98A–98N identified in the settings file 66 are used to configure the Web server computer.

Figure 4:
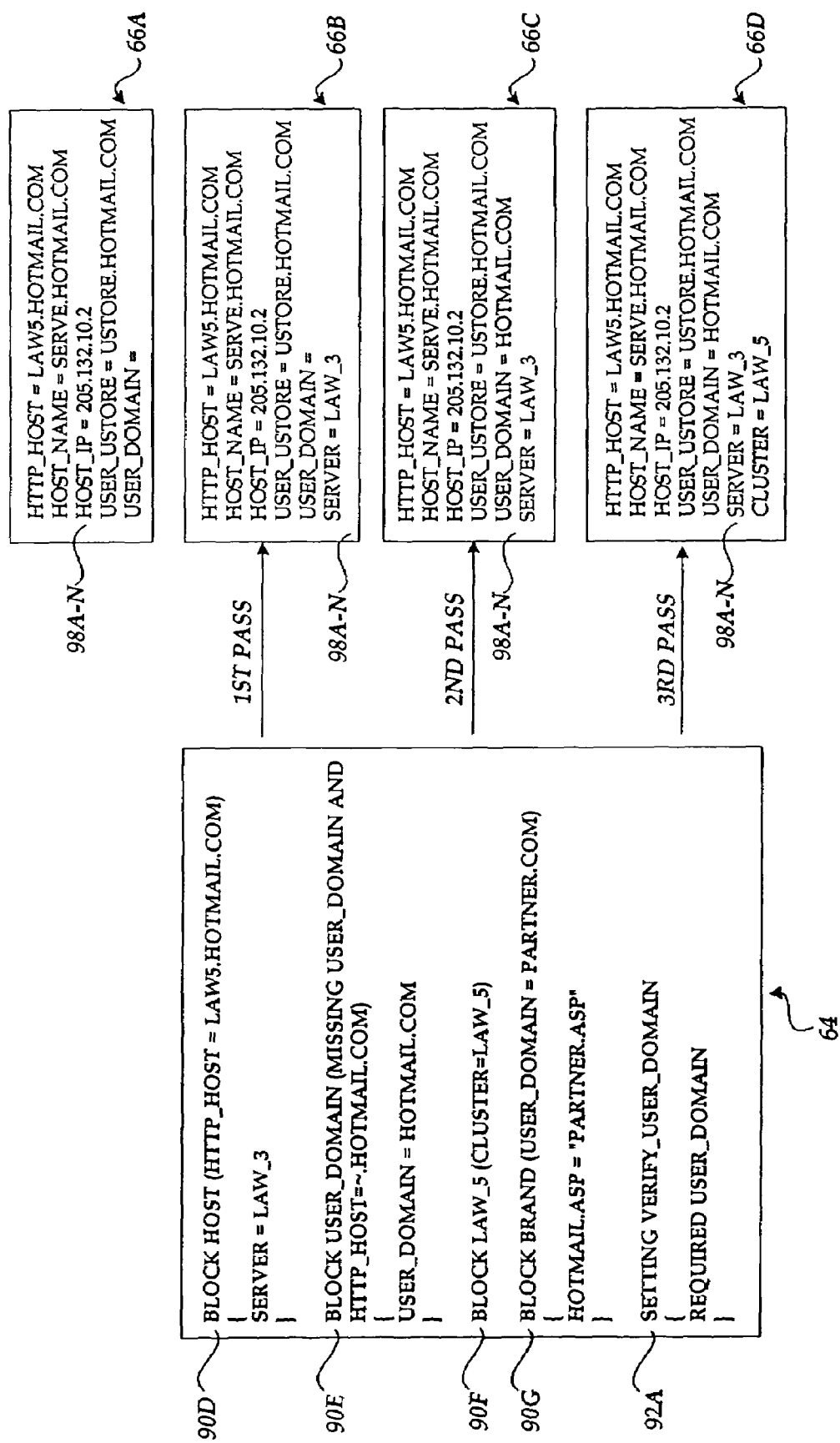
FIG. 4 is a block diagram illustrating the creation of a settings file based upon information contained in a global configuration file according to an embodiment of the present invention.

Referring now to FIG. 4, aspects of the present invention will be described in the context of an illustrative global configuration file 64 utilized to create a settings file 66D for configuring a Web server computer. The creation of the settings file and configuration of the Web server computer occurs in response to a request received at the Web server computer. In response to the request, the Web server computer parses the global configuration file 64 and creates a settings file 66D. The settings file 66D is then used to configure the Web server computer.

Prior to beginning the parse of the global configuration file 64, the Web server computer adds one or more configuration settings to the settings file 66A. According to an embodiment of the present invention, these configuration settings are determined based upon information provided with the request, or from information maintained in a registry of the Web server computer. So, for instance, the settings file 66A may contain configuration settings 98A–98N prior to the parse of the global configuration file. Configuration settings may include HTTP_HOST, HOST_NAME, HOST_IP, and USER_USTORE configuration settings 98A–98N and their associated values.

In order to parse the global configuration file 66, the Web server computer tests rules associated with each block in the global configuration file 66 to determine if they are satisfied. The rules are tested using the current contents of the settings file 66A–66N. If a rule is satisfied or triggered, the configuration settings associated with the block are added to the settings file 66A–66N and all of the untriggered rules in the configuration file are again tested with the new contents of the settings file, the next rule is tested. So, for instance, the rule associated with the block "HOST" 90D comprises "HTTP_HOST=LAW5.HOTMAIL.COM." Therefore, for the rule to be satisfied, the configuration parameter "HTTP_HOST" must be set to "LAW5.HOTMAIL.COM" in the settings file 66A. Because the HTTP_HOST parameter is set to "LAW5.HOTMAIL.COM" in the settings file 66, the rule is satisfied. Accordingly, the configuration setting associated with the block "HOST" 90D is added to the settings file 66A to create the settings file 66B. The rule associated with the block "USER_DOMAIN" 90E is then tested using the new settings file 66B.

The rule "MISSING USER_DOMAIN AND HTTP_HOST=~.HOTMAIL.COM" is associated with the block "USER_DOMAIN" 90E. The "MISSING" command indicates that the element is true if the parameter is undefined. The "~" character is utilized as a wildcard placeholder. Therefore, this rule is also satisfied because the settings file 66B indicates that the USER_DOMAIN configuration setting is undefined and that the HTTP_HOST configuration parameter is set to "LAW5.HOTMAIL.COM." Accordingly, the configuration parameters associated with the block "USER_DOMAIN" 90E are added to the settings file 66B to create the new settings file 66C. The subsequent blocks "LAW_5" 90F and "BRAND" 90G are tested in a similar fashion to create the settings file 66D.

The global configuration file 64 may also contain a required configuration setting 92A. When the Web server computer has completed its parse of the blocks in the global configuration file 64 having rules, it determines if any required configuration settings 92A have been specified. If required configuration settings 92A have been specified, the Web server computer determines whether the required configuration settings 92A are contained in the settings file 66D. If the required configuration settings 92A are not contained in the settings file 66D, the Web server computer generates an error message. If the required configuration settings 92A are contained in the settings file 66D, the Web server computer utilizes the contents of the settings file 66D to configure itself. In the global configuration file 64 shown in FIG. 4, the configuration setting "USER_DOMAIN" has been specified as a required configuration setting 92A. Because the settings file contains a USER_DOMAIN configuration setting, the settings file 66D is valid and may be utilized by the Web server computer to configure itself.

Figure 5:
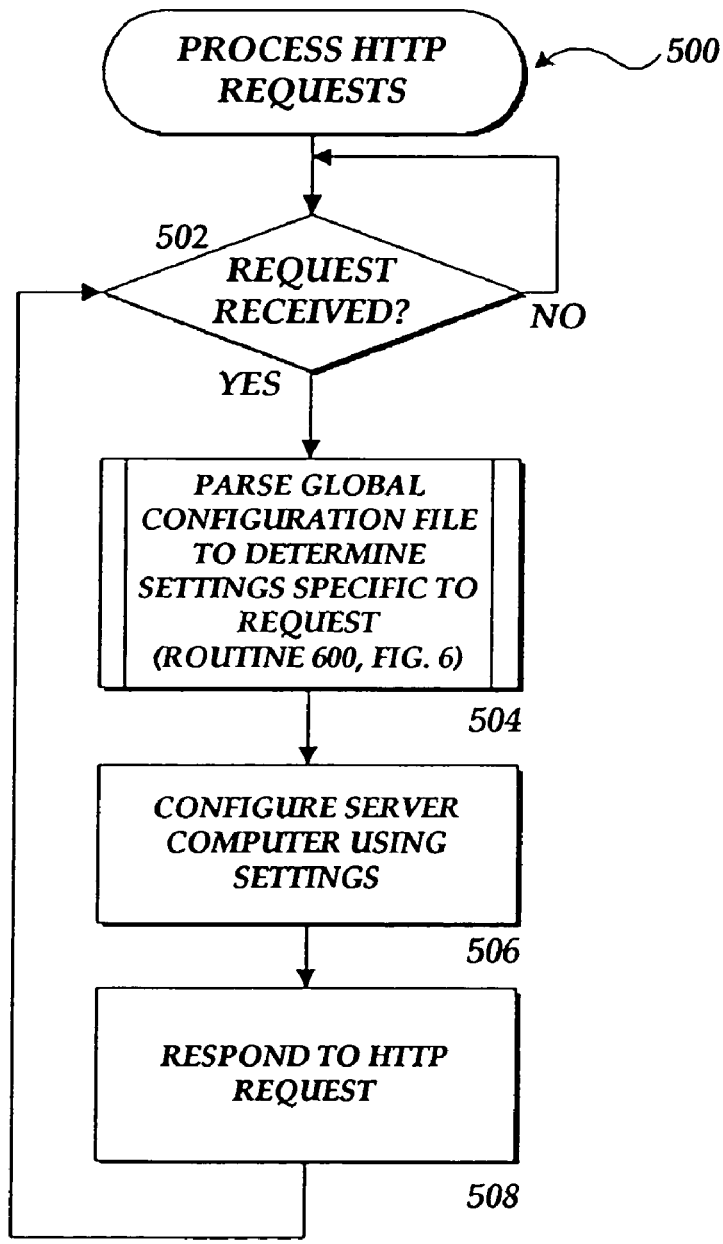
FIG. 5 is a flow diagram illustrating a routine for processing server requests in an embodiment of the present invention.

Referring now to FIG. 5, an illustrative Routine 500 will be described for processing requests received at a server computer embodying aspects of the present invention. Routine 500 begins at block 502, where a determination is made as to whether a request has been received at a Web server computer. According to an embodiment of the present invention, the request comprises an HTTP request message for a resource located at, or available to, the Web server computer. For instance, the request may comprise an HTTP request message for a Web page located at the Web server computer. If such a request has not been received, the Routine 500 branches back to block 502, where another similar determination is made.

If, at block 502, it is determined that a request has been received at the Web server computer, the Routine 500 continues to block 504, where the Web server computer parses a global configuration file to identify configuration settings specific to the request. As will be described in more detail below, the configuration file is iteratively passed until no rules can be evaluated as true using the contents of the settings file. The contents of the settings file is then considered "final," and is utilized to configure the server computer. An illustrative routine for parsing the global configuration file is described below with reference to FIG. 6.

From block 504, the Routine 500 continues to block 506, where the Web server computer is configured using the configuration settings that are identified as specific to the request. The Routine 500 then continues to block 508, where the Web server computer responds to the request. From block 508, the Routine 500 continues to block 502, where the Web server computer again determines if a request has been received for a resource located at, or available to, the Web server computer. In this manner, the Web server computer dynamically configures itself each time a request is received.

Figure 6:
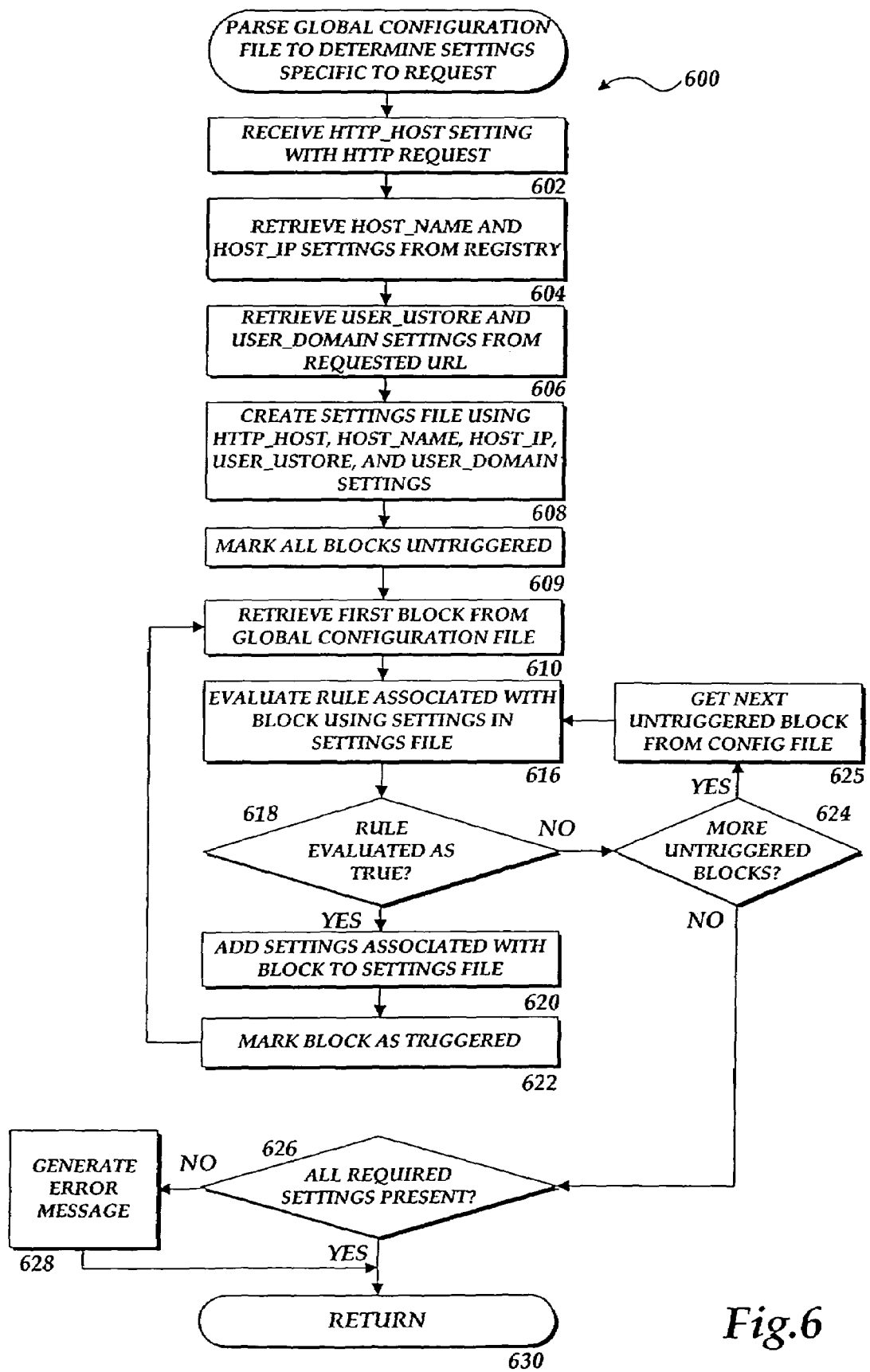
FIG. 6 is a flow diagram illustrating a routine for dynamically configuring a server computer according to an embodiment of the present invention.

Referring now to FIG. 6, an illustrative Routine 600 will be described for parsing a global configuration file to determine configuration settings specific to a particular request. Routine 600 begins at block 602, where an "HTTP_HOST" configuration setting is identified. According to an embodiment of the present invention, the HTTP_HOST configuration setting is received as part of the request and identifies the name of the particular host computer to which the request is directed. From block 602, the Routine 600 continues to block 604, where "HOST_NAME" and "HOST_IP" configuration settings are retrieved from a location accessible to the operating system of the Web server computer. For instance, the HOST_NAME and HOST_IP configuration settings may be retrieved from a registry maintained at the Web server computer. The HOST_NAME configuration setting specifies the server name for the Web server computer. The HOST_IP configuration setting specifies the Internet Protocol address for the Web server computer.

From block 604, the Routine 600 continues to block 606, where "USER_USTORE" and "USER_DOMAIN" configuration settings. The USER_USTORE configuration setting identifies a location that stores information corresponding to the user of a client computer making the request. For instance, the USER_USTORE configuration setting may identify the location of a particular database that maintains configuration information specific to the user. The USER_DOMAIN configuration setting identifies the domain to which the request is directed. According to an embodiment of the present invention, the USER_USTORE and USER_DOMAIN configuration settings are passed to the Web server computer as a portion of the requested URL. Those skilled in the art should appreciate that the USER_USTORE and USER_DOMAIN settings may be stored on the client computer making the request and passed to the Web server computer using a persistent client object, or cookie, or other method known to those skilled in the art.

From block 606, the Routine 600 continues to block 608, where the HTTP_HOST, HOST_NAME, HOST_IP, USER_DOMAIN, and USER_USTORE configuration settings are stored in a settings file. As described above with respect to FIG. 3B, the settings file comprises a list of the configuration settings and their associated configuration values. Those skilled in the art should appreciate that these configuration settings are illustrative and that fewer, more, or different configuration settings may be identified and stored in the settings file prior to parsing the configuration file.

From block 608, the Routine 600 continues to block 609, where all blocks in the configuration file are marked as untriggered. The Routine 600 then continues to block 610, where a first block is retrieved from the global configuration file. As described above with respect to FIG. 3A, the global configuration file contains one or more blocks. Each block may contain a rule that, if evaluated as true, will cause configuration settings contained in the block to be added to the settings file. Additionally, the global configuration file may contain one or more required configuration parameters that must be included in the settings file when the global configuration file has been completely parsed.

From block 610, the Routine 600 continues to block 616. At block 616, the rule associated with the current block is evaluated using the configuration settings contained in the settings file. The Routine 600 then continues from block 616, to block 618, where a determination is made as to whether the rule was evaluated as true. As described above with respect to FIG. 3A, a rule comprises a Boolean expression that may be evaluated as true or false using the configuration settings contained in the settings file. If the rule is evaluated as false, the Routine 600 branches from block 618 to block 624. If the rule is evaluated as true, the Routine 600 continues from block 618 to block 620, where the configuration settings associated with the rule are added to the settings file. The Routine 600 then continues from block 620 to block 622 where a flag is set indicating that the current block has been triggered. From block 622, the Routine 600 returns to block 622, where the first block in the configuration file is again received.

If at block 618, the rule is evaluated as false, the Routine 600 branches to block 624, where the Web server computer makes a determination as to whether any additional untriggered blocks remain in the global configuration file. If more untriggered blocks remain, the Routine 600 branches from block 624 to block 625, where the next untriggered block is retrieved from the global configuration file as the current block. The Routine 600 then continues to block 616, where the block is parsed as described above.

If, at block 624, it is determined that no untriggered blocks remain in the global configuration file, the Routine 600 branches to block 626. At block 626, the Web server computer determines whether particular configuration settings are required in the settings file and, if so, whether the required configuration settings are present. If the Web server computer determines that the required configuration settings are not present, the Routine 600 branches to block 628, where an error message is generated at the Web server computer. An error message may also be generated at the client computer that initiated the request. If, at block 626, the Web server computer determines that all of the required configuration settings are present in the settings file, the Routine 600 continues to block 630, where it ends.

In light of the above, it should be appreciated by those skilled in the art that the present invention provides a method and system for dynamically configuring a server computer. While an actual embodiment of the invention has been illustrated and described, it will be appreciated that various changes can be made therein without departing from the spirit and scope of the invention.

The embodiments of the invention in which an exclusive property or privilege is claimed are defined as follows:

1. A method for dynamically configuring a server computer, comprising:
   in response to receiving a request for a resource located at said server computer, analyzing said request for a resource;
   based on said analysis, dynamically determining one or more configuration settings from information contained in said request for a resource;
   evaluating a configuration rule using said configuration settings to determine whether a said configuration rule is satisfied;
   in response to determining that said configuration rule is satisfied, adding one or more configuration settings associated with said configuration rule to said configuration settings to create new configuration settings;
   dynamically determining whether an additional configuration rule remains to be tested;
   in response to determining that an additional configuration rule remains to be tested,
      (i) evaluating said additional configuration rule with said configuration settings to determine if said additional configuration rule is satisfied, and
      (ii) in response to determining that said additional configuration rule is satisfied, adding one or more configuration settings associated with said additional configuration rule to said configuration settings to create modified new configuration settings; and
   configuring said server computer based upon said new configuration setting or said modified new configuration settings.

2. The method of claim 1, further comprising:
   determining whether said new configuration settings include a required configuration setting; and
   generating an error message at said server computer in response to determining that said required configuration setting is not included in said new configuration settings.

3. The method of claim 2, wherein identifying one or more configuration settings based on said request comprises identifying one or more configuration settings based upon data contained in said request.

4. The method of claim 3, wherein said request comprises a hyper-text transfer protocol request and wherein said data contained in said request comprises a hypertext transfer protocol host parameter.

5. The method of claim 4, wherein identifying one or more configuration settings based on said request comprises identifying one or more configuration settings stored in a registry of said server computer.

6. The method of claim 5, wherein said one or more configuration settings stored in a registry of said server computer comprise a host name for said server computer and a host internet protocol address for said server computer.

7. The method of claim 6, wherein identifying one or more configuration settings based on said request comprises retrieving said one or more configuration settings from a client computer that originated said request.

8. The method of claim 7, wherein said configuration rule and said configuration settings associated with said configuration rule are stored in a global configuration file accessible to said server computer.

9. A computer-readable medium having computer executable instructions for performing the method of claim 1.

10. A computer-controlled apparatus, comprising:
a central processing unit;
a memory;
a network interface;
a storage device; and
a global configuration file stored on said storage device comprising one or more configuration rules and one or more configuration settings associated with each configuration rule; and wherein
said central processing unit is operative to execute instructions stored in said memory, which, in response to receiving a request for a resource accessible to said computer-controlled apparatus via said network interface, cause said computer-controlled apparatus to:
 (i) analyze said request for a resource;
 (ii) based on said analysis, dynamically determine one or more configuration settings from information contained in said request for a resource;
 (iii) evaluate one of said configuration rules to determine whether said configuration rule is satisfied;
 (iv) in response to determining that said configuration rule is satisfied, add said configuration settings associated with said configuration rule to a configuration settings file stored in said memory or on said storage device;
 (v) determine whether one of said configuration rules in untriggered;
 (vi) in response to determining that one of said configuration rules has not been triggered,
  (a) evaluate said untriggered configuration rule to determine if said untriggered configuration rule is satisfied,
  (b) in response to determining that said untriggered configuration rule is satisfied, add said configuration settings associated with said untriggered configuration rule to said configuration setting file stored in said memory or on said storage device to create a new configuration settings file; and
 (vii) respond to said request for a resource using said configuration settings or said new configuration settings.

11. The computer-controlled apparatus of claim 10, wherein said request for a resource comprises a hyper-text transfer protocol request for information accessible to said computer-controlled apparatus.

12. The computer-controlled apparatus of claim 11, wherein identifying one or more configuration settings based on said request comprises identifying a hyper-text transfer protocol host parameter contained in said hyper-text transfer protocol request.

13. The computer-controlled apparatus of claim 12, wherein identifying one or more configuration settings based on said request comprises identifying one or more configuration settings stored in a registry stored in said storage device.

\* \* \* \* \*